US009264295B1

(12) United States Patent
Sherwood et al.

(10) Patent No.: US 9,264,295 B1
(45) Date of Patent: Feb. 16, 2016

(54) SYSTEMS AND METHODS FOR FORWARDING BROADCAST NETWORK PACKETS WITH A CONTROLLER

(75) Inventors: Robert W. Sherwood, Palo Alto, CA (US); Robert Edward Adams, San Mateo, CA (US); Daniel E. Talayco, Sunnyvale, CA (US); Robert K. Vaterlaus, Oakland, CA (US); Omar Baldonado, Palo Alto, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 253 days.

(21) Appl. No.: 13/411,496

(22) Filed: Mar. 2, 2012

(51) Int. Cl.
*H04L 12/28* (2006.01)
*H04L 12/56* (2006.01)
*H04L 12/24* (2006.01)
*H04W 28/02* (2009.01)

(52) U.S. Cl.
CPC ............... *H04L 41/00* (2013.01); *H04W 28/02* (2013.01); *H04Q 2213/00* (2013.01)

(58) Field of Classification Search
USPC .......................................................... 370/392
See application file for complete search history.

(56) References Cited

U.S. PATENT DOCUMENTS

| 4,740,954 | A | * | 4/1988 | Cotton | H04L 12/185 370/256 |
| 6,147,995 | A | | 11/2000 | Dobbins et al. | |
| 6,308,218 | B1 | * | 10/2001 | Vasa | H04L 12/462 709/238 |
| 6,839,348 | B2 | | 1/2005 | Tang et al. | |
| 7,116,681 | B1 | * | 10/2006 | Hovell | H04L 29/12009 370/389 |
| 7,120,834 | B1 | | 10/2006 | Bishara | |
| 7,181,674 | B2 | | 2/2007 | Cypher et al. | |
| 7,188,191 | B1 | * | 3/2007 | Hovell | H04L 12/4633 709/230 |
| 7,512,146 | B1 | | 3/2009 | Sivasankaran et al. | |
| 7,733,859 | B2 | | 6/2010 | Takahashi et al. | |
| 7,792,972 | B2 | | 9/2010 | Kamata et al. | |
| 8,160,102 | B2 | * | 4/2012 | Cha | H04W 80/04 370/389 |
| 2004/0252680 | A1 | * | 12/2004 | Porter | H04L 12/437 370/360 |
| 2005/0216442 | A1 | | 9/2005 | Liskov et al. | |
| 2008/0071927 | A1 | * | 3/2008 | Lee | H04L 29/12358 709/245 |

(Continued)

OTHER PUBLICATIONS

Pfaff et al., OpenFlow Switch Specification, Dec. 31, 2009, 42 pages.

(Continued)

*Primary Examiner* — Faruk Hamza
*Assistant Examiner* — Shah R Zaman
(74) *Attorney, Agent, or Firm* — Treyz Law Group, P.C.; Michael H. Lyons

(57) ABSTRACT

A network of switches that forwards network packets between end hosts may be controlled by a controller. The controller may maintain information that identifies subsets of the end hosts that are associated with respective broadcast domains. The controller may configure the switches in the network to identify broadcast network packets and to forward the broadcast network packets to the controller. The controller may identify which broadcast domain is associated with a received broadcast network packet based on information such as source information retrieved from the broadcast network packet. The controller may identify switches that are coupled to the end hosts of a broadcast domain associated with the received broadcast network packet. The controller may forward the broadcast network packet to the identified switches through network control paths and may direct the identified switches to forward the broadcast network packet to end hosts of the associated broadcast domain.

21 Claims, 16 Drawing Sheets

(56) References Cited

U.S. PATENT DOCUMENTS

| | | |
|---|---|---|
| 2008/0130648 A1 | 6/2008 | Ra et al. |
| 2008/0189769 A1* | 8/2008 | Casado et al. .................... 726/4 |
| 2008/0239956 A1 | 10/2008 | Okholm et al. |
| 2008/0247395 A1 | 10/2008 | Hazard |
| 2008/0279196 A1 | 11/2008 | Friskney et al. |
| 2009/0003243 A1 | 1/2009 | Vaswani et al. |
| 2009/0067348 A1 | 3/2009 | Vasseur et al. |
| 2009/0086731 A1* | 4/2009 | Lee .................. H04H 60/73 370/389 |
| 2009/0132701 A1 | 5/2009 | Snively |
| 2009/0234932 A1* | 9/2009 | Hamada .............. H04W 84/20 709/208 |
| 2009/0265501 A1 | 10/2009 | Uehara et al. |
| 2009/0287837 A1* | 11/2009 | Felsher ................ G06F 19/322 709/229 |
| 2009/0310582 A1 | 12/2009 | Beser et al. |
| 2010/0257263 A1 | 10/2010 | Casado et al. |
| 2010/0290465 A1 | 11/2010 | Ankaiah et al. |
| 2011/0069621 A1 | 3/2011 | Gintis et al. |
| 2011/0090911 A1 | 4/2011 | Hao et al. |
| 2011/0255540 A1 | 10/2011 | Mizrahi et al. |
| 2011/0296002 A1 | 12/2011 | Caram |
| 2011/0299528 A1* | 12/2011 | Yu ....................... H04L 12/1886 370/390 |
| 2011/0299537 A1* | 12/2011 | Saraiya et al. ................ 370/392 |
| 2012/0039338 A1* | 2/2012 | Morimoto ............. H04L 47/125 370/392 |
| 2012/0140637 A1* | 6/2012 | Dudkowski ............ H04L 45/00 370/238 |
| 2012/0155467 A1* | 6/2012 | Appenzeller ........... H04L 45/54 370/392 |
| 2012/0201169 A1 | 8/2012 | Subramanian et al. |
| 2012/0218997 A1* | 8/2012 | Shah .................. H04L 12/4625 370/390 |
| 2012/0287936 A1 | 11/2012 | Biswas et al. |
| 2012/0324068 A1 | 12/2012 | Jayamohan et al. |
| 2013/0034104 A1* | 2/2013 | Yedavalli ................ H04L 41/12 370/400 |
| 2013/0058354 A1* | 3/2013 | Casado ............... H04L 12/4633 370/401 |
| 2013/0058358 A1 | 3/2013 | Fulton et al. |
| 2013/0070762 A1 | 3/2013 | Adams et al. |
| 2013/0132536 A1 | 5/2013 | Zhang et al. |
| 2013/0182722 A1 | 7/2013 | Vishveswaraiah et al. |
| 2013/0191537 A1 | 7/2013 | Ivanov et al. |
| 2013/0215769 A1* | 8/2013 | Beheshti-Zavareh ... H04L 45/64 370/252 |

OTHER PUBLICATIONS

McKeown et al., OpenFlow: Enabling Innovation in Campus Networks, Mar. 14, 2008, 6 pages.
Cisco Systems, Cisco Catalyst 6500 Architecture, 1992-2007, 28 pages.
Adams et al., U.S. Appl. No. 13/220,431, filed Aug. 29, 2011.
Casado et al., "SANE: A Protection Architecture for Enterprise Networks," Usenix Security, Aug. 2006 (15 pages).
Casado et al., "Ethane: Taking Control of the Enterprise," Conference of Special Interest Group on Data Communication (SIGCOMM), Japan, Aug. 2007 (12 pages).
Koponen et al., "Onix: A Distributed Control Platform for Large-scale Production Networks," Usenix Security, Oct. 2010 (14 pages).
Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/technicalreports/openflow-tr-2009-1-flowvisor.pdf.
Cisco Systems, "Scalable Cloud Network with Cisco Nexus 1000V Series Switches and VXLAN," 2011 [Retrieved on Feb. 6, 2012]. Retrieved from the Internet: <URL:http://www.cisco.com/en/US/prod/collateral/switches/ps9441/ps9902/white_paper_c11-685115.pdf>.
Sherwood et al., U.S. Appl. No. 13/367,256, filed Feb. 6, 2012.

\* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

PACKET OUT MESSAGE

SYSTEMS AND METHODS FOR FORWARDING BROADCAST NETWORK PACKETS WITH A CONTROLLER

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

The network may include end hosts that send network packets to the switches for forwarding through the network. End hosts in the network sometimes send broadcast network packets that are flooded throughout the network (i.e., the broadcast network packets are destined for all end hosts in the network). As an example, an end host may send broadcast network packets to discover network addresses of other end hosts. Flooding of a network associated with broadcasting network packets can generate undesirable amounts of network traffic (e.g., because the network packets may be forwarded by the network switches to many end hosts). Therefore, it may be desirable to provide the network with improved network packet broadcasting capabilities.

SUMMARY

A network may include end hosts that are coupled to switches that are used to forward network packets between the end hosts. The switches may be controlled by a controller such as a centralized controller server or a distributed controller server. The controller may maintain information that identifies subsets of the end hosts that are associated with respective broadcast domains. The information may include a list of end hosts for each broadcast domain. The list of end hosts for each broadcast domain may be gathered by the controller from a user such as network administrator.

The controller may configure the switches in the network to identify broadcast network packets and to forward the broadcast network packets to the controller. For example, the controller may provide flow table entries to the switches that direct the switches to forward matching broadcast network packets to the controller. The controller may receive a given broadcast network packet from the switches and identify which broadcast domain is associated with that broadcast network packet (e.g., the controller may identify which subset of the end hosts is associated with the broadcast network packet).

The controller may identify which broadcast domain is associated with a received broadcast network packet based on information such as source information retrieved from the broadcast network packet. For example, the controller may retrieve source address information such as source Ethernet address information from header fields of the broadcast network packet and use the source address information to determine which broadcast domain is associated with the broadcast network packet.

The controller may identify switches that are coupled to the end hosts of a broadcast domain associated with a received broadcast network packet and control the identified switches to forward the broadcast network packet to the end hosts of the broadcast domain. For example, the controller may send control messages through network control paths to the identified switches. In this scenario, the control messages may include the broadcast network packet and instructions that direct the switches to forward the broadcast network packet to ports that are coupled to the end hosts of the associated broadcast domain.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
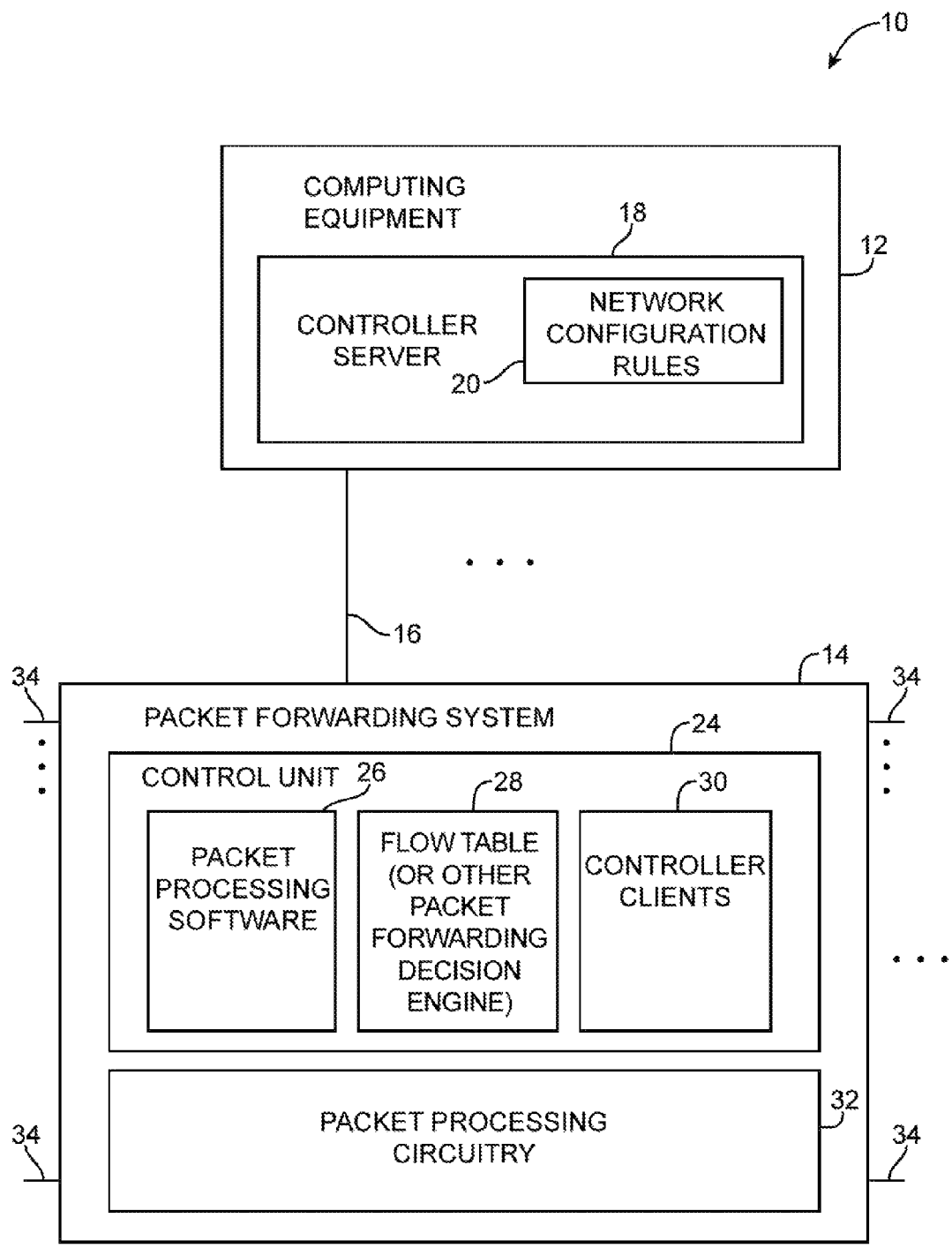
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18, may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
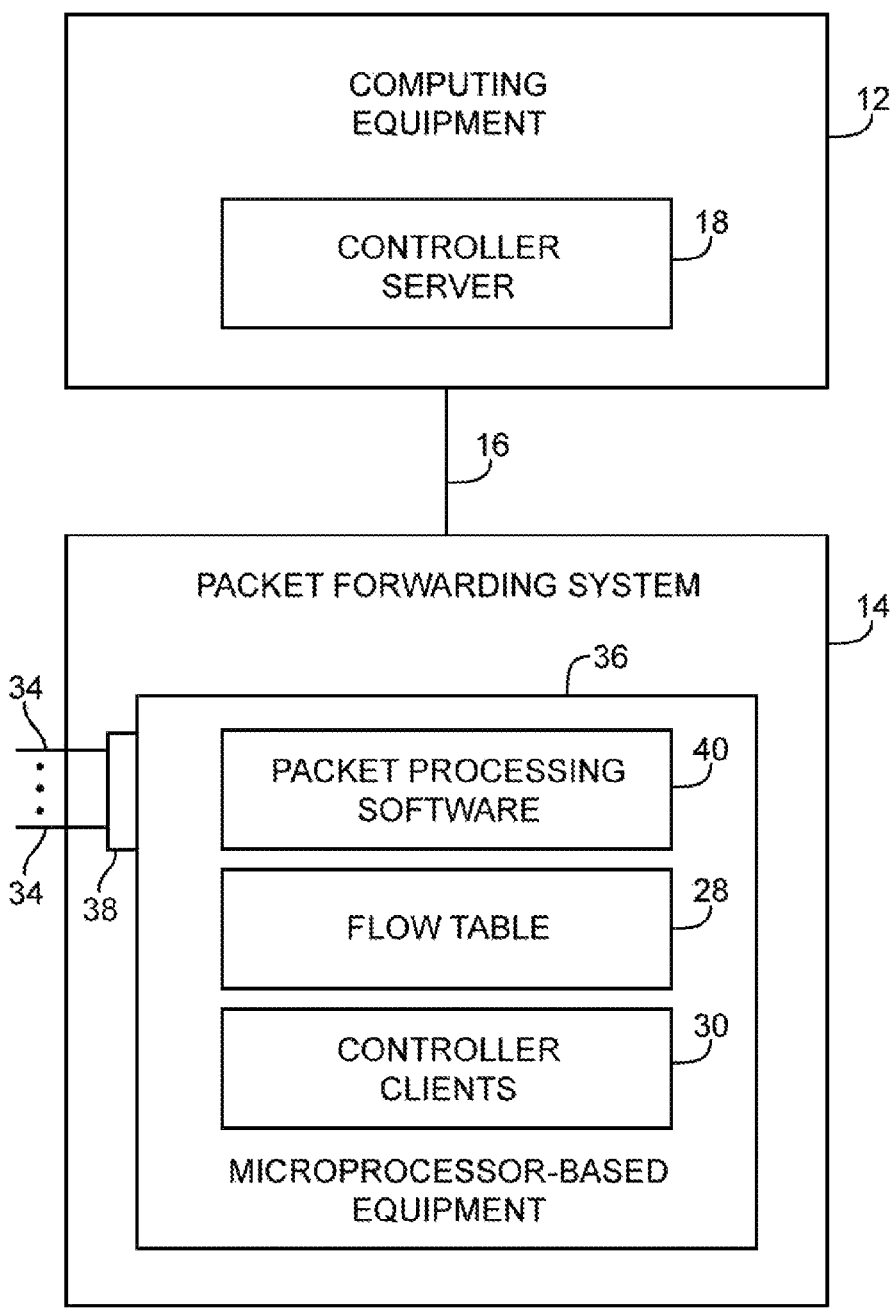
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
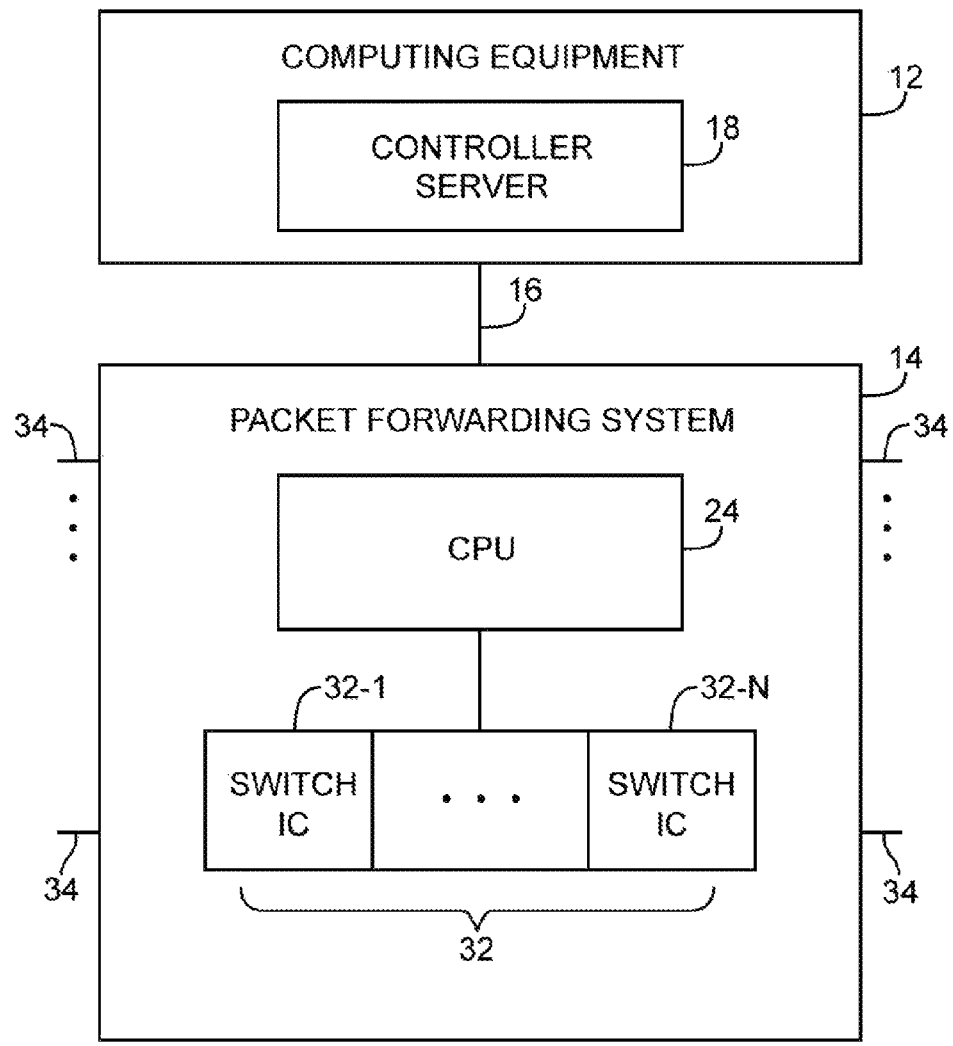
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
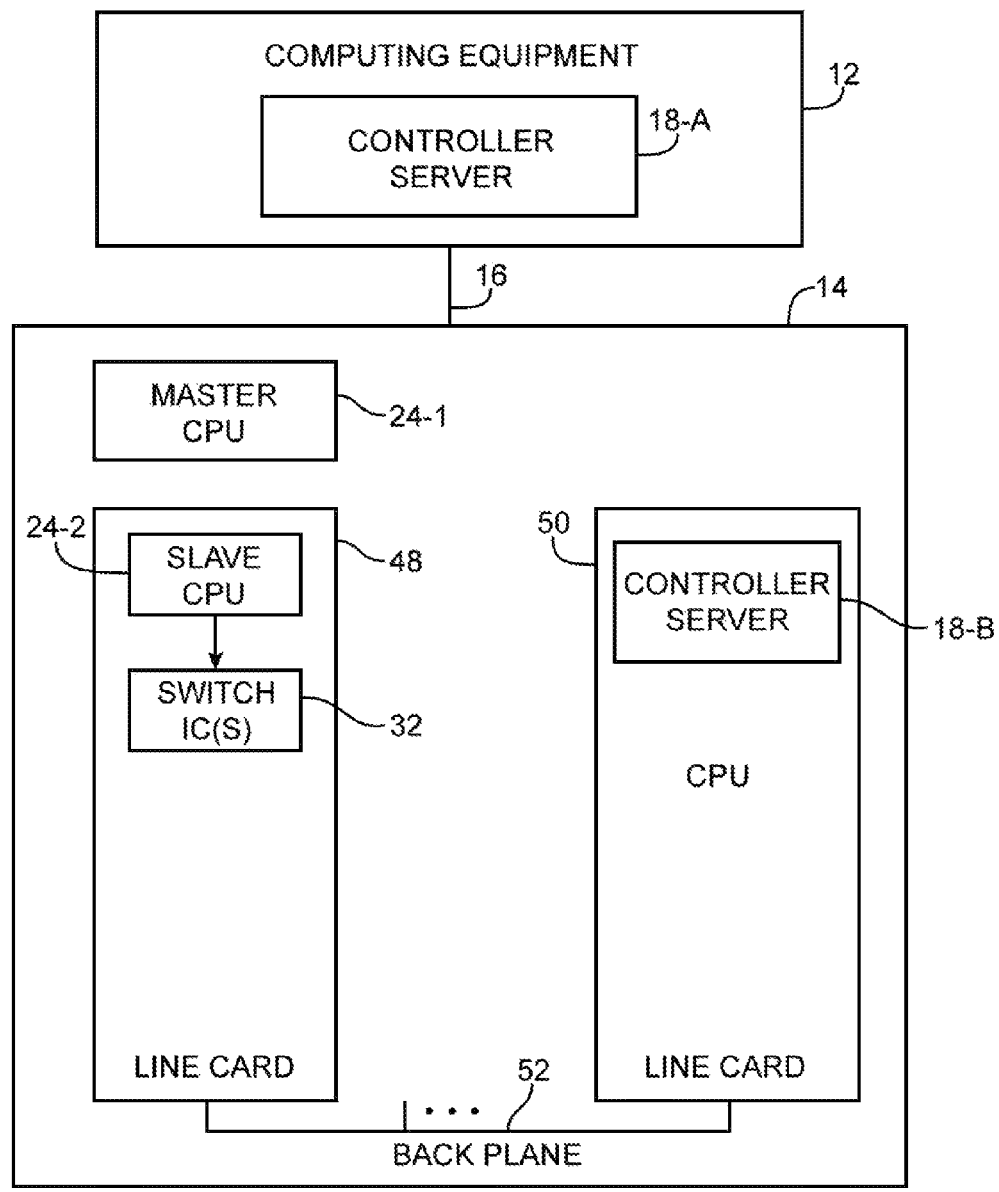
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
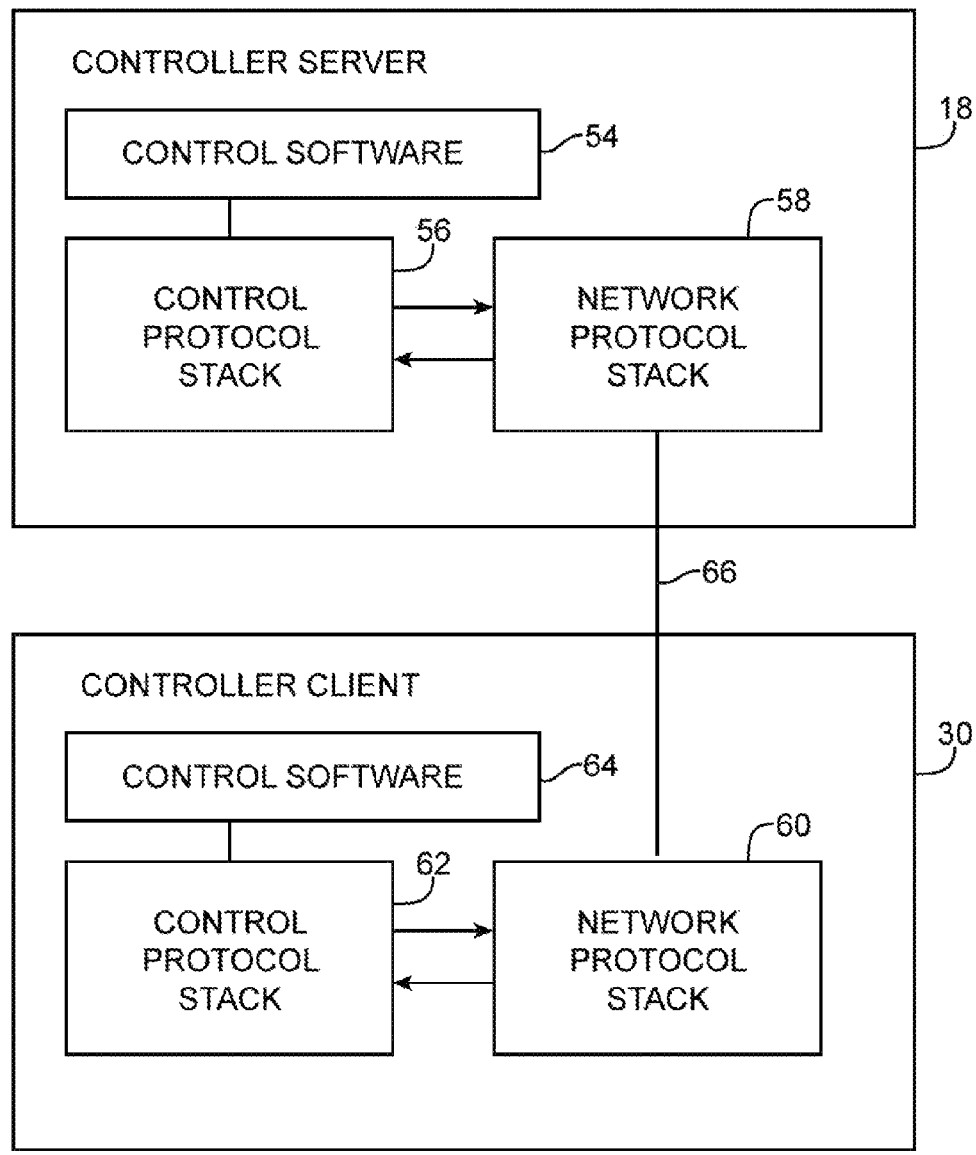
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
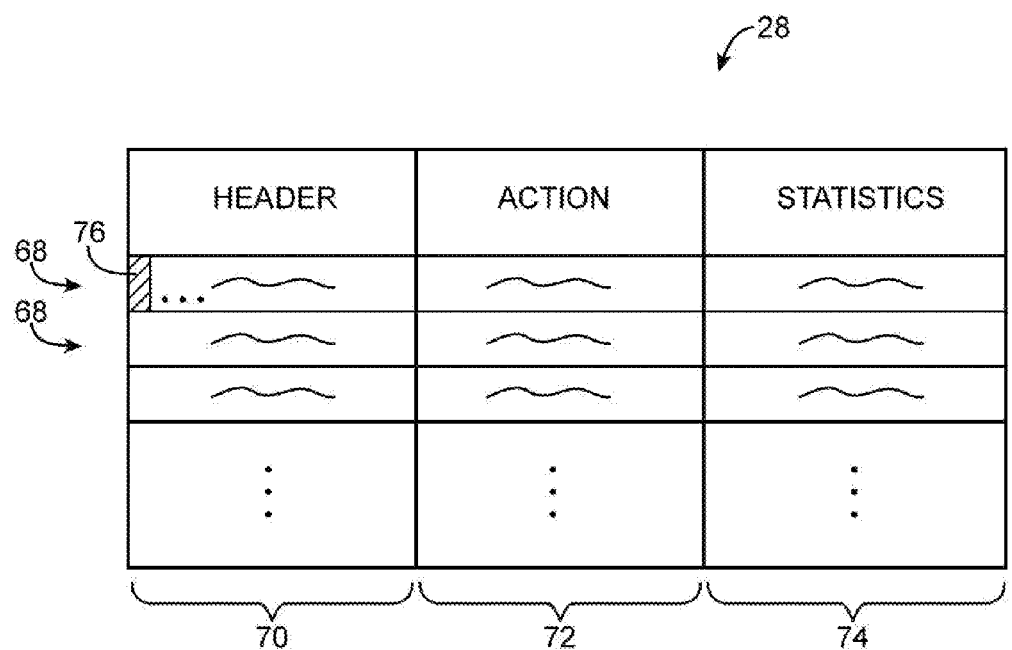
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
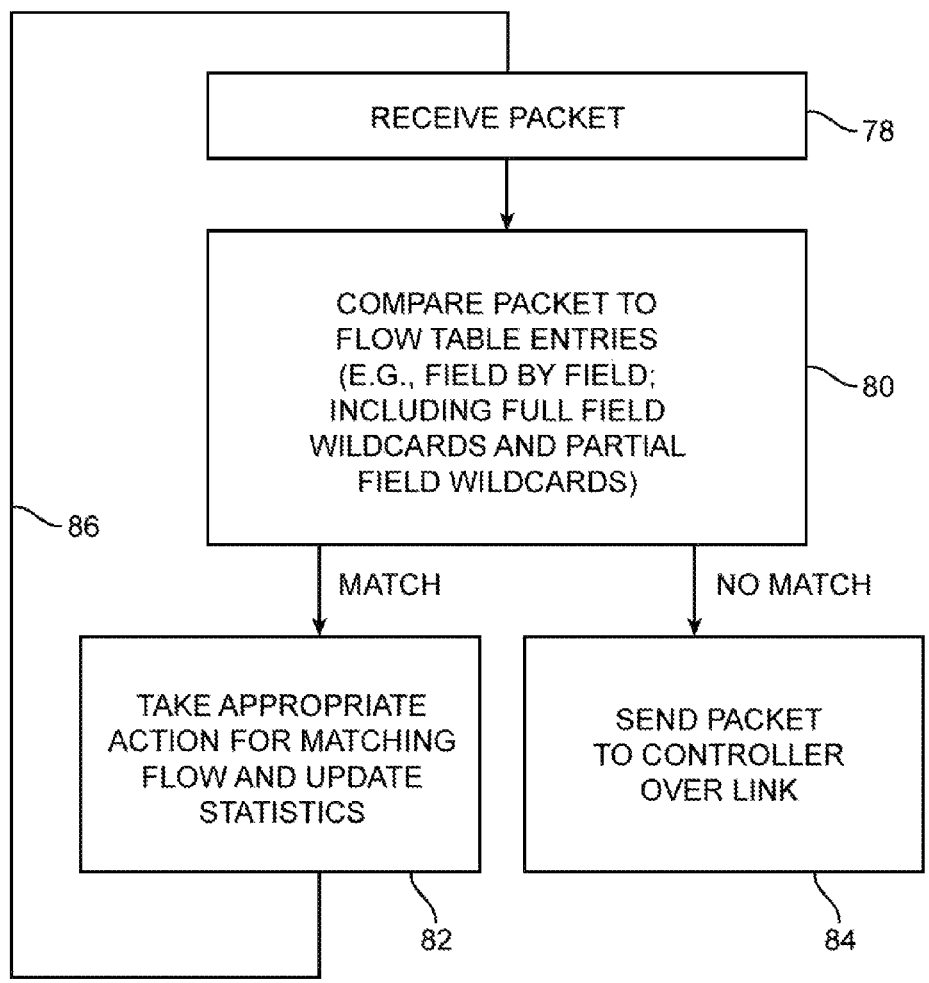
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
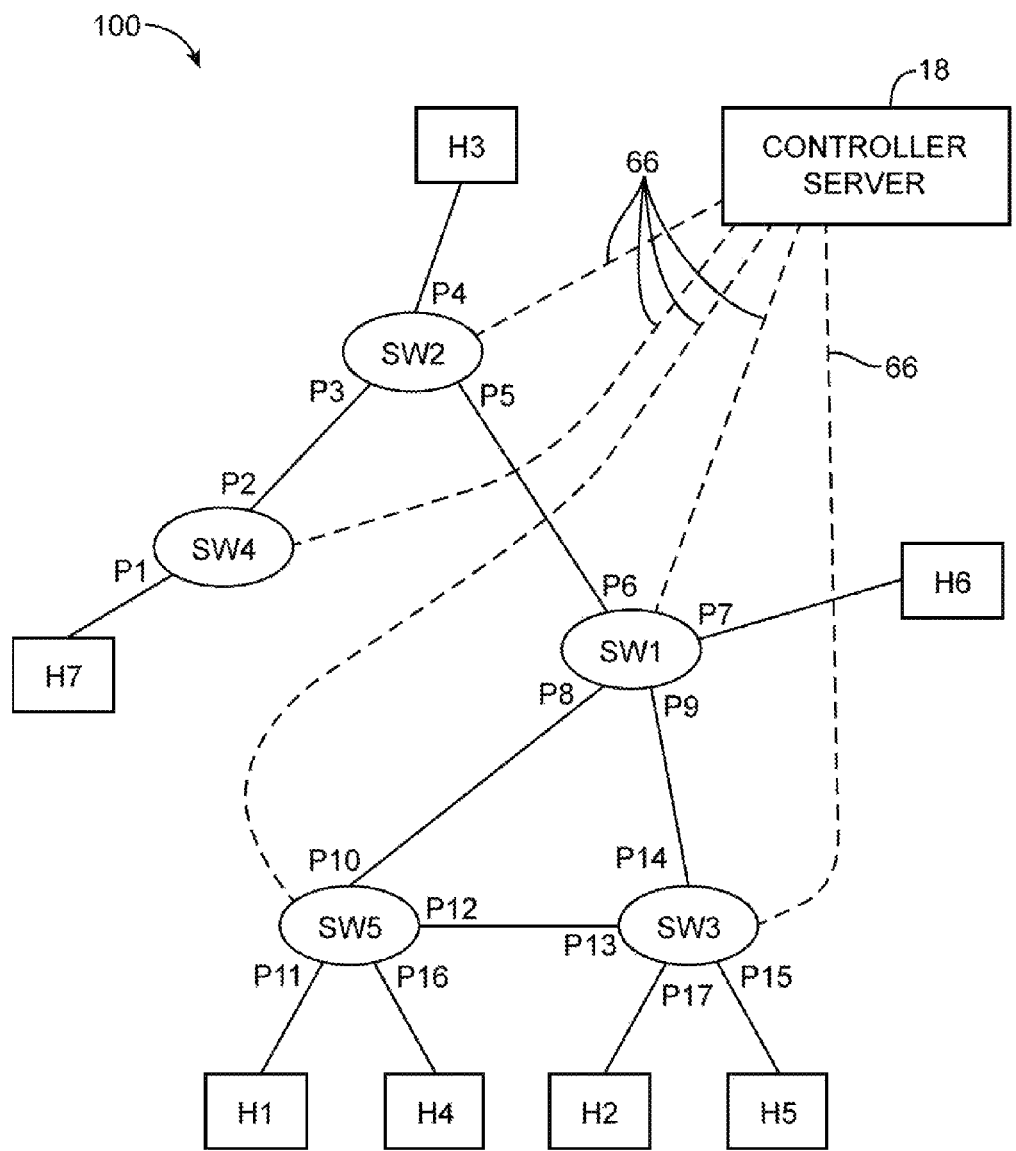
FIG. 8 is a diagram of an illustrative network that may be partitioned into broadcast domains in accordance with an embodiment of the present invention.

A controller (e.g., a controller server or other controllers implemented on computing equipment) may be used to control a network of switches. The controller may include one or more controller servers or may be distributed throughout one or more of the switches (e.g., portions of the controller may be implemented on storage and processing circuitry of multiple switches). FIG. 8 shows an illustrative network 100 with a controller server 18 that controls switches in network 100.

As shown in FIG. 8, network 100 may include end hosts (e.g., end hosts H1, H2, H3, H4, H5, H6, and H7) that are coupled to network switches in network 100 (e.g., switches SW1, SW2, SW3, SW4, and SW5). The switches may have ports to which end hosts or other switches may be coupled. For example, switch SW1 may have ports P6, P7, P8, and P9 that are coupled to switch SW2, end host H6, switch SW5, and switch SW3, respectively. As another example, switch SW4 may have ports P1 and P2 that are coupled to end host H7 and switch SW2, respectively.

Network 100 may include one or more controllers such as controller server 18. Controller server 18 may be used to control switches (e.g., switches SW1, SW2, SW3, etc.) via network paths 66. For example, controller server 18 may provide flow table entries to the switches over network paths 66. The example of FIG. 8 in which controller server 18 is used to control switches is merely illustrative. If desired, any suitable controller may be used to control switches of network 100.

End hosts in the network can communicate with other end hosts by transmitting packets that are forwarded by switches in the network. For example, end host H1 may communicate with other end hosts by transmitting network packets to port P11 of switch SW5. In this scenario, switch SW5 may receive the network packets and forward the network packets along appropriate network paths (e.g., based on flow table entries that have been provided by controller server 18).

Switches such as switch SW5 may forward network packets based on information such as destination network addresses retrieved from network packets. For example, switch SW5 may retrieve destination Media Access Control (MAC) address information or other Ethernet address information from the network packets that identifies which end host(s) the network packets should be forwarded to. End hosts in the network may sometimes send broadcast packets that are destined for all other end hosts in the network. For example, end host H1 may send a broadcast packet by transmitting a network packet with a broadcast destination Ethernet address. In this scenario, switches in the network that receive the broadcast packet may identify the broadcast destination Ethernet address and forward the broadcast packet to all other end hosts in the network.

It may be desirable to isolate some of the end hosts from other end hosts by controlling which end hosts receive broadcast packets from any given end host. For example, isolating groups of end hosts from end hosts may improve network security (e.g., because end hosts in a first group may be prevented from communicating with end hosts in a second group). Controller server 18 may be used to partition network 100 into broadcast domains formed from groups of end hosts. Controller server 18 may control switches in network 100 so that network packets received from end hosts in a given broadcast domain are only forwarded to other end hosts in that broadcast domain, thereby isolating broadcast domains from each other.

Figure 9:
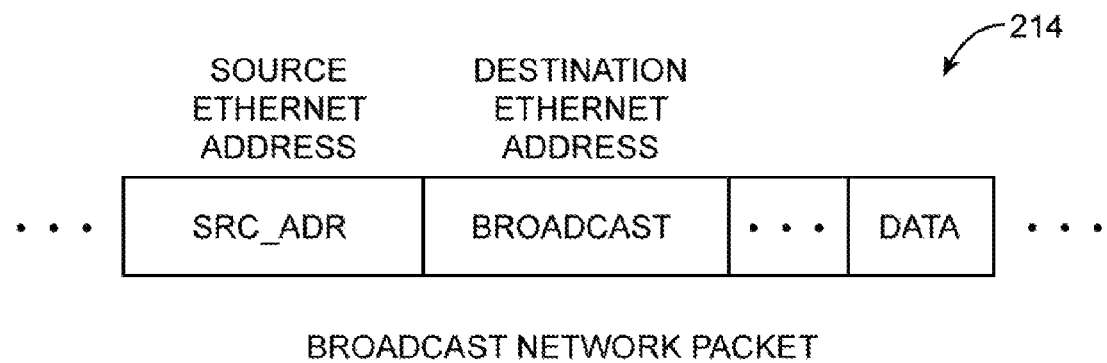
FIG. 9 is a diagram of an illustrative broadcast network packet that may be received by a controller from switches in accordance with an embodiment of the present invention.

Controller server 18 may partition network 100 into broadcast domains by forwarding broadcast network packets from an end host of a given broadcast domain to other end hosts of that broadcast domain through network control paths (e.g., network paths through controller server 18). FIG. 9 is a diagram of an illustrative broadcast network packet 214 that may be sent by an end host of network 100. Broadcast network packet 214 may sometimes be referred to as a broadcast packet. As shown in FIG. 9, broadcast network packet 214 may include a source Ethernet address SRC_ADR, a broadcast destination Ethernet address (e.g., a broadcast MAC address such as 0xFF:FF:FF:FF:FF:FF), and data to be transmitted to other end hosts. The example of FIG. 9 in which broadcast network packet 214 includes Ethernet header fields (e.g., source and destination Ethernet address fields) and a data field is merely illustrative. If desired, broadcast network packet 214 may include other network protocol header fields such as internet protocol header fields, etc.

Figure 10:
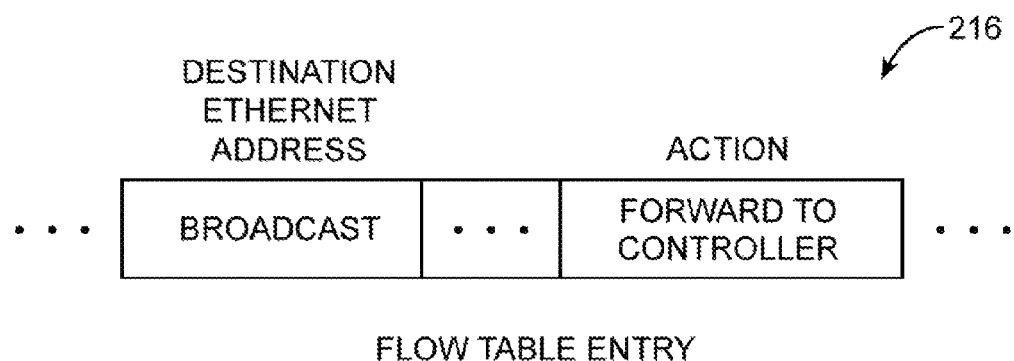
FIG. 10 is a diagram of an illustrative flow table entry that may be provided by a controller to a network switch so that broadcast network packets are forwarded to the controller in accordance with an embodiment of the present invention.

Controller server 18 may direct switches in network 100 to forward broadcast network packets that are received from end hosts to controller server 18. The switches may forward the broadcast network packets to controller server 18 via control paths such as paths 66. Controller server 18 may direct the switches to forward broadcast network packets by providing appropriate flow table entries to the switches. FIG. 10 is a diagram of an illustrative flow table entry 216 that may be provided to switches in network 100 to direct the switches to forward broadcast network packets to a controller such as controller server 18. Flow table entry 216 may be provided by controller server 18 to the switches via control paths 66.

As shown in FIG. 10, flow table entry 216 includes a broadcast destination Ethernet address that may be used by the switches to identify network packets that should be processed as specified by the action field of flow table entry 216. The action field of the flow table entry 216 may direct the switches to forward the identified network packets to controller server 18 (e.g., via control paths 66).

As an example, controller server 18 may provide each of switches SW1, SW2, SW3, SW4, and SW5 with flow table entry 216. In this scenario, the switches may use flow table entry 216 to identify broadcast network packets (e.g., network packets that have a broadcast destination Ethernet address) and forward the broadcast network packets to controller server 18.

Controller server 18 may process broadcast network packets (e.g., broadcast network packets that are forwarded to controller server 18 by switches) to determine which end hosts should receive the broadcast network packets. Controller server 18 may process a broadcast network packet by retrieving information from the broadcast network packet that may be used to identify which end host sent the broadcast network packet. For example, controller server 18 may retrieve information such as source Ethernet address information or other source information from header fields of the broadcast network packet. Controller server 18 may use the retrieved information to determine which broadcast domain is associated with the broadcast network packet (e.g., which broadcast domain is associated with the end host that sent the broadcast network packet).

Consider the scenario in which end host H1 sends a broadcast network packet to port P11 of switch SW5. In this scenario, switch SW5 may forward the broadcast network packet to controller server 18 (e.g., using flow table entries such as flow table entry 216 that have been provided to switch SW5). Controller server 18 may receive the broadcast network packet and retrieve the Ethernet address of end host H1 from the source Ethernet address field of the broadcast network packet. Based on the Ethernet address of end host H1, controller server 18 may identify a corresponding broadcast domain that is associated with end host H1. As an example, controller server 18 may maintain a database or list that identifies source information (e.g., Ethernet addresses) corresponding to each broadcast domain. In this scenario, controller server 18 may use the database to match the retrieved Ethernet address to a corresponding broadcast domain.

If desired, controller server 18 may identify a corresponding broadcast domain for a given broadcast network packet based on information transmitted along with the broadcast network packet (e.g., transmitted by the switch that forwarded the broadcast network packet to controller server 18). For example, in response to receiving a broadcast network packet at port P11, switch SW5 may forward the broadcast network packet to controller server 18 along with information identifying that the broadcast network packet was received at port P11 of switch SW5. In this scenario, controller server 18 may use the information to determine which end host and/or which broadcast domain is associated with the broadcast network packet (e.g., based on network topology information that identifies which end hosts are coupled to which ports).

Figure 11:
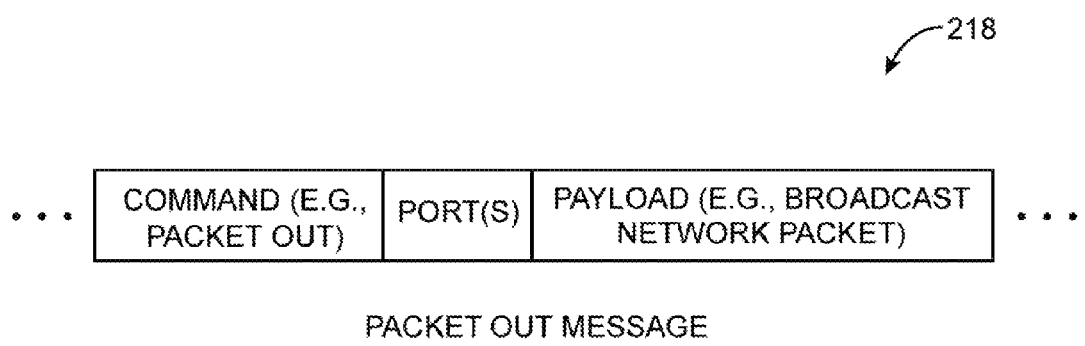
FIG. 11 is a diagram of an illustrative packet out message that may be transmitted to switches by a controller to forward a broadcast network packet to end hosts in accordance with an embodiment of the present invention.

Controller server 18 may forward a broadcast network packet received from an end host of a given broadcast domain to other end hosts of the broadcast domain (e.g., without forwarding the broadcast network packet to end hosts that are not associated with the broadcast domain). For example, controller server 18 may maintain a database of end host and broadcast domain information and use the database to determine which end hosts should receive the broadcast network packet. Controller server 18 may forward the broadcast network packet to appropriate end hosts by sending the broadcast network packet to switches that are coupled to the end hosts and directing the switches to forward the broadcast network packet to the end hosts. For example, the controller may send control messages that include the broadcast network packet and corresponding instructions for the switches. FIG. 11 is an illustrative control message 218 that may be sent by controller server 18 to direct switches to forward a broadcast network packet to end hosts. Control message 218 may sometimes be referred to as a packet out message, because message 218 may be sent by a controller to direct switches to forward a network packet to end hosts and/or other switches.

As shown in FIG. 11, packet out message 218 may include a command (e.g., a packet out command), one or more ports (e.g., a list of ports), and a payload. The command may direct switches that receive packet out message 218 to forward a packet stored in the payload from the port(s) identified by packet out message 218. As an example, to forward a broadcast network packet to end host H5, controller server 18 may forward a packet out message 218 to switch SW3 (e.g., via control path 66) that includes a packet out command and the broadcast network packet and identifies port P15. In this scenario, switch SW3 may receive the packet out message, retrieve the broadcast network packet from the payload of the packet out message, and forward the broadcast network packet from port P15 to end host H5.

Packet out message 218 may be sent by a controller to switches using protocols such as the OpenFlow protocol (e.g., protocols that may be used to generate control paths such as control paths 66 between the controller and the switches). In scenarios such as when packet out message 218 is sent from a controller to switches via OpenFlow control paths (e.g., paths 66), packet out message 218 may be referred to as an OpenFlow control packet, because OpenFlow control packet 218 is sent using the OpenFlow protocol over OpenFlow control paths.

By performing broadcast domain isolation using controller server 18, network traffic associated with network packet broadcasting may be reduced and network performance may be improved. For example, a broadcast network packet sent from end host H7 and received by end host H5 via network control paths (e.g., network paths through controller server 18 and including control paths 66) may bypass switches SW1 and SW2, thereby reducing the load on switches SW1 and SW2. Network traffic associated with network packet broadcasting may be reduced because broadcast network packets are only forwarded to end hosts that are members of associated broadcast domains (e.g., end hosts that are not associated with the broadcast domain of a given broadcast network packet may not receive that broadcast network packet).

Figure 12:
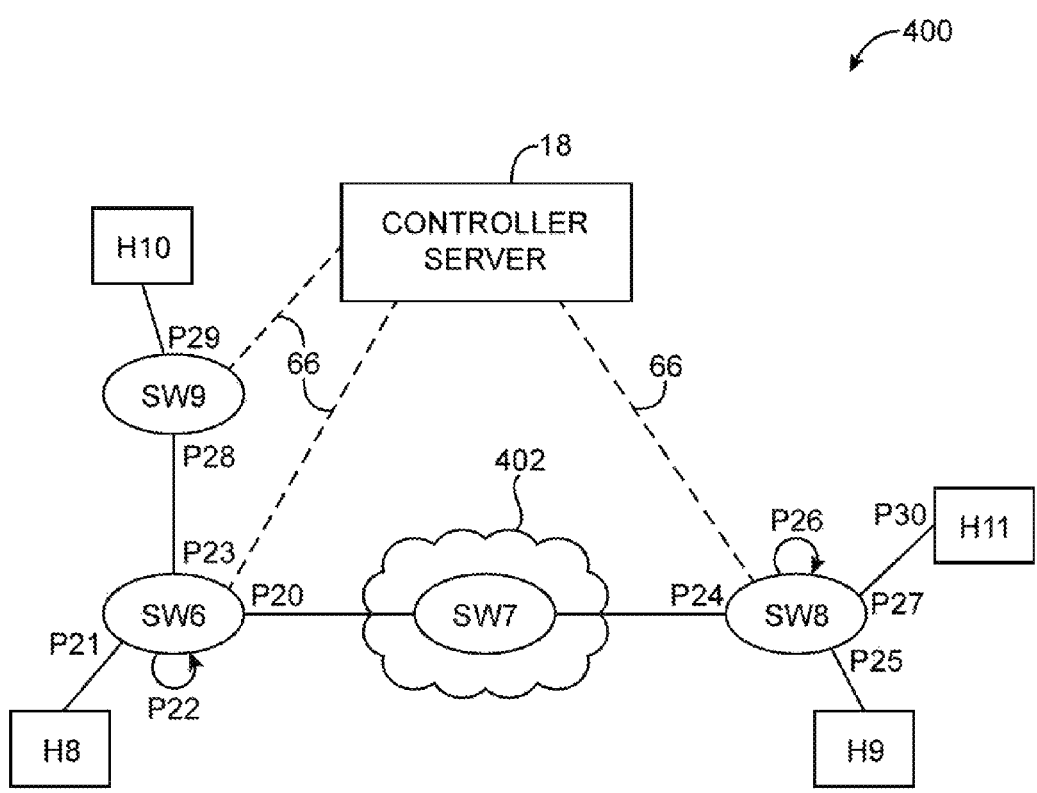
FIG. 12 is an illustrative network having client switches that are separated by non-client switches in accordance with an embodiment of the present invention.

A network may be formed from switches or other packet forwarding systems that have controller clients (and therefore are controlled by a controller such as controller server 18) and switches that do not have controller clients (e.g., switches that are not controlled by a controller). The switches with controller clients may sometimes be referred to herein as client switches. The switches that do not have controller clients may sometimes be referred to herein as non-client switches. FIG. 12 is a diagram of an illustrative network 400 formed from client switches (e.g., switches SW6, SW8, and SW9) and non-client switches (e.g., switch SW7). The client switches may be controlled by a controller server 18 via network paths 66, whereas controller server 18 may be unable to control the non-client switches.

Some of the client switches may be separated by one or more non-client switches. For example, client switch SW6 may be separated from client switch SW8 by non-client switch network 402. Non-client switch network 402 is shown in FIG. 12 as a single non-client switch SW7, but, in general, non-client switch network 402 may include any desired number of non-client switches (e.g., one non-client switch, tens of non-client switches, hundreds of non-client switches, or more). Non-client switches may, if desired, be interposed between any pair of client switches or between client switches and end hosts.

It may be difficult for controller server 18 to control client switches in the network so that broadcast network packets are appropriately forwarded through network paths that include non-client switches. In particular, non-client switches such as switch SW7 may process broadcast network packets unpredictably (e.g., because the non-client switches are not controlled by controller server 18).

Consider the scenario in which a broadcast network packet is forwarded from client switch SW6 to client switch SW8 through non-client switch SW7. In this scenario, non-client switch SW7 may undesirably modify broadcast network packet (e.g., by modifying header fields of the broadcast network packet) or may block the broadcast network packet. For example, non-client switch SW7 may be a network router configured to block broadcast network packets between switches SW6 and SW8 (e.g., non-client switch SW7 may prevent broadcast network packets that are sent from client switch SW6 from reaching client switch SW8 and vice versa).

Figure 13:
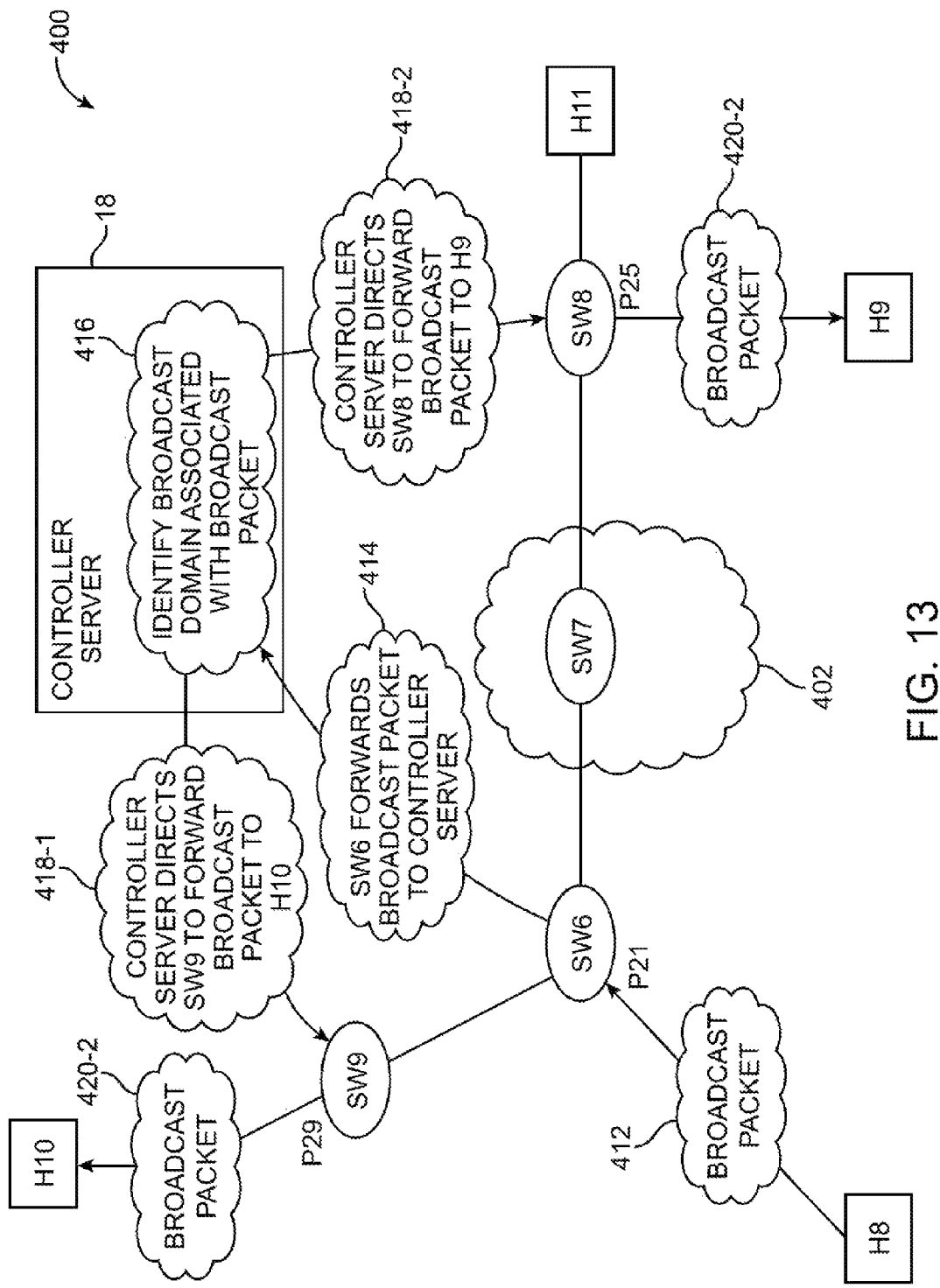
FIG. 13 is a diagram of illustrative steps that may be performed so that broadcast network packets are forwarded through network control paths in accordance with an embodiment of the present invention.

Controller server 18 may control the client switches to forward broadcast network packets through network control paths (e.g., network paths through controller server 18). By directing client switches to forward broadcast network packets through control paths, controller server 18 may bypass non-client switches such as non-client switch SW7. FIG. 13 is an illustrative diagram of steps that may be performed to forward broadcast network packets to desired end hosts of network 400 using network control paths. In the example of FIG. 13, end hosts H8, H9, and H10 may be associated with a given broadcast domain (e.g., a broadcast domain that excludes end host H11).

In step 412, end host H8 may send a broadcast network packet such as broadcast network packet 214 of FIG. 9 to port 21 of client switch SW6. The broadcast network packet may include a broadcast destination address and source information of end host H8 (e.g., a hardware address of end host H8 may be stored in a source Ethernet address field of the broadcast network packet). Client switch SW6 may receive the broadcast network packet and use flow table entries such as flow table entry 216 of FIG. 10 that have been provided by controller server 18 to process the broadcast network packet.

In step 414, client switch SW6 may determine from the flow table entries that the broadcast network packet should be forwarded to controller server 18. Client switch SW6 may then forward the broadcast network packet to controller server 18. For example, client switch SW6 may match the broadcast destination address with the destination address field of flow table entry 216 and perform the corresponding action specified in the action field of flow table entry 216 (e.g., forward the broadcast network packet to controller server 18). If desired, client switch SW6 may forward the broadcast network packet along with information such as which port the broadcast network packet was received at (e.g., port P21).

In step 416, controller server 18 may receive the broadcast network packet from client switch SW6 and identify an associated broadcast domain. Controller server 18 may identify the associated broadcast domain based on information retrieved from the broadcast network packet (e.g., based on source information such as source Ethernet address information) or based on information such as port information received from client switch SW6. In the example of FIG. 13, controller server 18 may identify that the broadcast domain formed from end hosts H8, H9, and H10 is associated with the broadcast network packet, because the broadcast network packet was sent from end host H8.

In steps 418-1 and 418-2, controller server 18 may control client switches that are coupled to the end hosts of the broadcast domain to forward the broadcast network packet to the end hosts of the broadcast domain, excluding the end host from which the broadcast network packet originated (e.g., excluding end host H8). Controller server 18 may identify which client switches are coupled to the end hosts of the broadcast domain based on network topology information that indicates which end hosts are coupled to each of the client switches. Controller server 18 may control the client switches by forwarding the broadcast network packet to the client switches and directing the client switches to forward the broadcast network packet from ports that are coupled to the end hosts of the broadcast domain.

In the example of FIG. 13, controller server 18 may send a first packet out message during step 418-1 to client switch SW9 that includes the broadcast network packet (e.g., in the payload field of the packet out message) and directs client switch SW9 to forward the broadcast network packet from port P29 to end host H10. Controller server 18 may send a second packet out message during step 418-2 to client switch SW8 that directs client switch SW8 to forward the broadcast network packet from port P25 to end host H9.

The example of FIG. 13 in which controller server 18 performs the operations of steps 418-1 and 418-2 separately is merely illustrative. If desired, controller server 18 may perform steps 418-1 and 418-2 simultaneously (e.g., by sending packet out messages to client switches SW9 and SW8 in parallel).

In steps 420-1 and 420-2, client switches SW8 and SW9 may forward the broadcast network packet to end hosts H10 and H9, respectively. Client switches SW8 and SW9 may, for example, forward the broadcast network packet based on packet out messages received from controller server 18.

Figure 14:
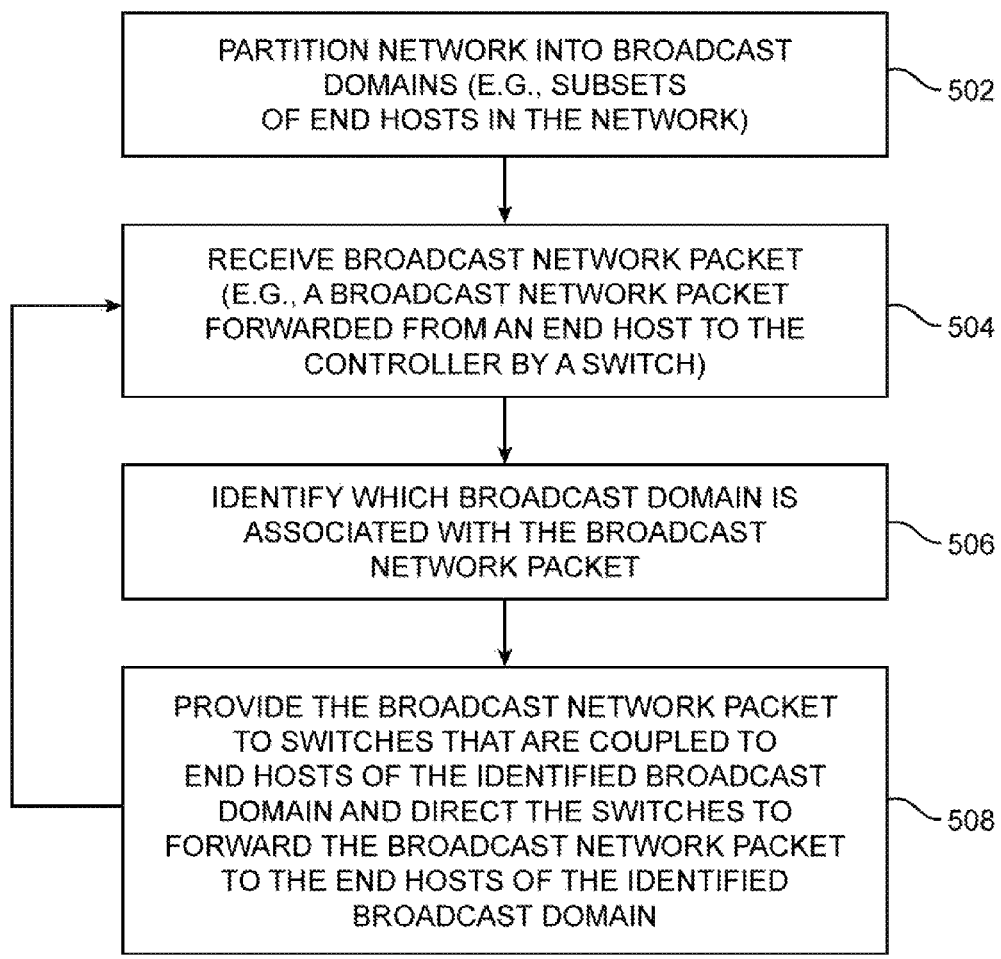
FIG. 14 is a flowchart of illustrative steps that may be performed by a controller to partition a network into broadcast domains in accordance with an embodiment of the present invention.

FIG. 14 is a flowchart of illustrative steps that may be performed by a controller such as controller server 18 to accommodate broadcast domain isolation using network control paths of a network.

In step 502, the controller may partition the network into broadcast domains (e.g., subsets of end hosts in the network). The controller may partition the network based on information received from a user such as a system administrator. For example, the controller may partition the network based on information from a system administrator that identifies broadcast domains and corresponding end hosts. In this scenario, the information may include end host information such as network address information (e.g., hardware address information or protocol address information). The controller may store the information in a database or other desired forms of storage on the controller.

In step 504, the controller may receive a broadcast network packet. For example, the controller may receive a broadcast network packet from an end host via a client switch.

In step 506, the controller may identify which broadcast domain is associated with the received broadcast network packet. As an example, the controller may identify which end host sent the broadcast network packet by retrieving source address information from the broadcast network packet. In this scenario, the controller may determine which broadcast domain is associated with the identified end host based on information retrieved from a database (e.g., a database including broadcast domain information received from a user such as a system administrator). Step 416 of FIG. 13 may, for example, be performed by the controller during step 506.

In step 508, the controller may provide the broadcast network packet to switches that are coupled to end hosts of the identified broadcast domain and direct the switches to forward the broadcast network packet to the end hosts of the identified broadcast domain. Steps 418-1 and 418-2 of FIG. 13 may, for example, be performed by the controller during step 508. The process may then loop back to step 504 to perform broadcast domain isolation.

The example of FIG. 14 in which the network is partitioned into broadcast domains during step 502 is merely illustrative. If desired, end hosts may be removed and/or added from broadcast domains at any desired time during normal operation of the controller. For example, the controller may receive additional broadcast domain information from a system administrator during steps 504, 506, or 508. In this scenario, the controller may dynamically update a database of broadcast domain information based on the information received from the system administrator.

Figure 15:
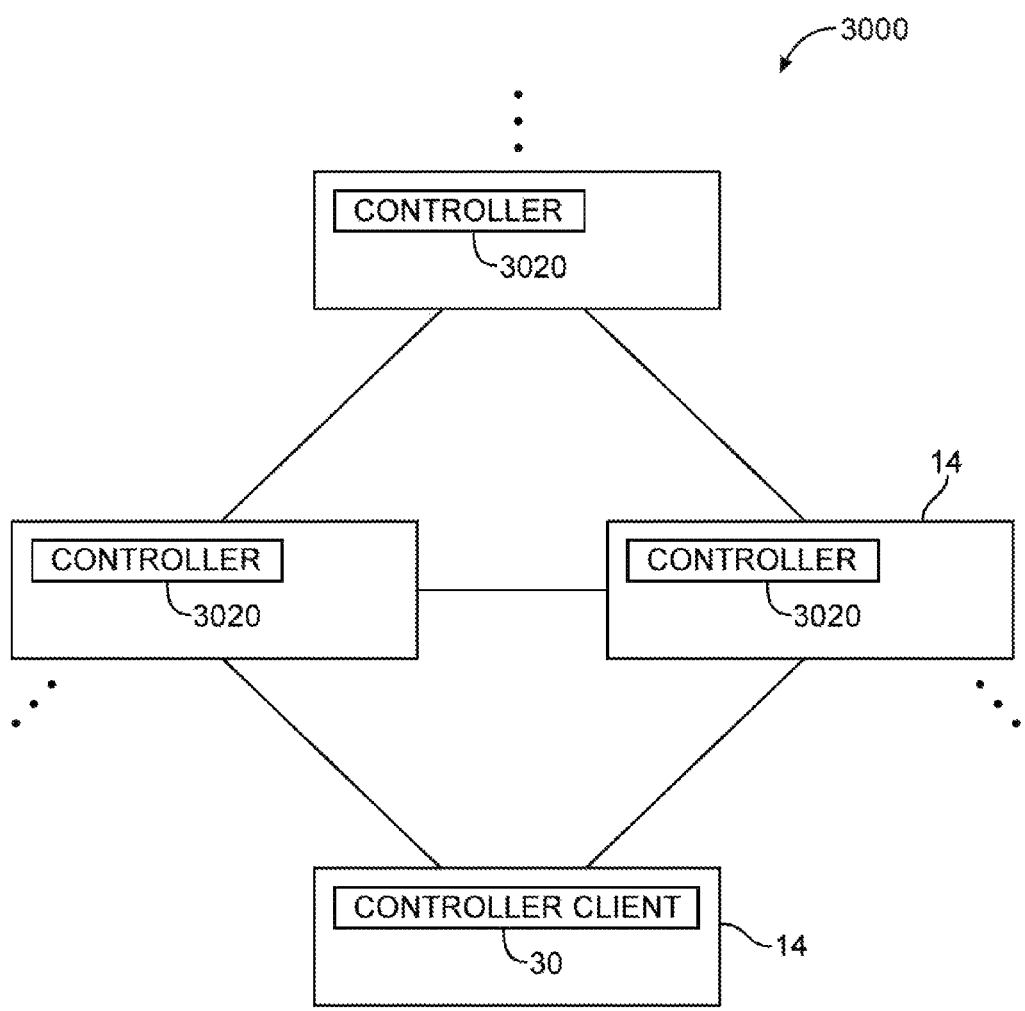
FIG. 15 is a diagram of an illustrative network in which a controller may be distributed throughout switches in the network in accordance with an embodiment of the present invention.

FIG. 15 shows an illustrative example in which controllers 3020 may be distributed on switches 14 throughout network 3000. Controllers 3020 may be distributed on some or all of network switches 14. Controller clients such as controller client 30 may communicate with one or more of controllers 3020 via network communications links (e.g., controllers 3020 may send instructions to controller client 30 via the communications links). Controllers 3020 may communicate with each other to collectively control switches 14 or may individually control switches 14. As an example, controllers 3020 may collectively control network 3000 by communicating with each other. Controllers 3020 may share information relating to network topology, network traffic, end hosts that are coupled to switches 14, etc.

The foregoing is merely illustrative of the principles of this invention and various modifications can be made by those skilled in the art without departing from the scope and spirit of the invention.

What is claimed is:

1. A method of using a controller to control switches in a network having end hosts that are coupled to the switches, the method comprising:
   with the controller, configuring switches in the network to identify broadcast network data packets that are received by the switches from the end hosts and to forward the identified broadcast network data packets to the controller;
   with the controller, maintaining information identifying subsets of the end hosts that are associated with respective different broadcast domains;
   with the controller, controlling a first set of switches coupled to end hosts of a first broadcast domain and a second set of switches coupled to end hosts of a second broadcast domain that is different from the first broadcast domain by providing forwarding table entries to the first and second sets of switches, wherein at least one non-client switch that is not controlled by the controller is interposed between first and second switches in the first set of switches;
   with the controller, receiving the broadcast network data packets from a given end host of the first broadcast domain via the first switch; and
   with the controller, forwarding the broadcast network data packets to the end hosts of the first broadcast domain while bypassing the non-client switch by sending the forwarding table entries to at least the second switch.

2. The method defined in claim 1, further comprising:
   with the controller, receiving a given one of the broadcast network data packets from the switches; and
   with the controller, identifying which of the different subsets of the end hosts is associated with the given one of the broadcast network data packets.

3. The method defined in claim 2 wherein identifying which of the different subsets of the end hosts is associated with the given one of the broadcast network data packets comprises:
   retrieving source information from the given one of the broadcast network data packets; and
   identifying which of the different subsets of the end hosts is associated with the given one of the broadcast network data packets based at least partly on the retrieved source information.

4. The method defined in claim 3 wherein retrieving the source information from the given one of the broadcast network data packets comprises:
   retrieving source address information from header fields of the given one of the broadcast network data packets.

5. The method defined in claim 4 wherein retrieving the source address information from the given one of the broadcast network data packets comprises:
   retrieving source Ethernet address information from the header fields of the given one of the broadcast network data packets.

6. The method defined in claim 3 further comprising:
   with the controller, identifying switches that are coupled to the end hosts of the identified subset of the end hosts; and
   with the controller, controlling the identified switches to forward the given one of the broadcast network data packets to the end hosts of the identified subset.

7. The method defined in claim 6 wherein controlling the identified switches to forward the given one of the broadcast network data packets to the end hosts of the identified subset comprises:
   with the controller, forwarding the given one of the broadcast network data packets through the controller to the identified switches.

8. The method defined in claim 6 wherein controlling the identified switches to forward the given one of the broadcast network data packets to the end hosts of the identified subset comprises:
   with the controller, sending packet out messages that contain the given one of the broadcast network data packets to the identified switches.

9. The method defined in claim 6 wherein identifying the switches that are coupled to the end hosts of the identified subset comprises:
   with the controller, using network topology information gathered from the switches to determine which of the switches are coupled to the end hosts of the identified subset.

10. The method defined in claim 2 wherein the information identifying the different subsets of the end hosts comprises at least one list of end hosts, the method further comprising:
    with the controller, gathering the at least one list of end hosts from a user.

11. The method defined in claim 1 wherein the controller comprises a controller server and wherein configuring the switches in the network to identify the broadcast network data packets that are received by the switches and to forward the broadcast network data packets to the controller comprises:
    with the controller server, configuring the switches in the network to identify the broadcast network data packets that are received by the switches and to forward the broadcast network data packets to the controller server.

12. The method defined in claim 1 wherein configuring the switches in the network to identify the broadcast network data packets that are received by the switches and to forward the broadcast network data packets to the controller comprises:
    with the controller, providing flow table entries to the switches that direct the switches to forward the broadcast network data packets that are received by the switches to the controller.

13. A method of using a controller to forward broadcast network packets through a network of switches, wherein the network includes end hosts that are coupled to the switches, the method comprising:
    with the controller, maintaining information identifying different subsets of the end hosts that are associated with different respective broadcast domains;
    with the controller, receiving a broadcast network packet from a given end host;
    in response to receiving the broadcast network packet, identifying which subset of the end hosts is associated with the given end host;
    with the controller, forwarding the broadcast network packet to each of the end hosts of the identified subset;
    with the controller, identifying which switches are coupled to the end hosts of the identified subset; and
    with the controller, forwarding the broadcast network packet to the identified switches, wherein forwarding the broadcast network packet to the end hosts of the identified subset comprises sending control messages to the identified switches, the switches comprise a first switch and a second switch that are controlled by the controller, at least one non-client switch that is not controlled by the controller is interposed between the first and second switches in the network, receiving the broadcast network packet from the given end host comprises receiving the broadcast network packet from the given end host via the first switch, and forwarding the broadcast network packet to the end hosts of the identified subset comprises bypassing the non-client switch by sending the control messages to the second switch.

14. The method defined in claim 13 further comprising:
with the controller, configuring the switches to forward broadcast network packets that are received from the end hosts to the controller, wherein receiving the broadcast network packet from the given end host comprises receiving the broadcast network packet from the given end host through an intervening switch.

15. The method defined in claim 13 wherein the control messages include the broadcast network packet.

16. The method defined in claim 15 wherein the identified switches include ports to which the end hosts of the identified subset are coupled and wherein sending control messages to the identified switches comprises sending control messages that direct the identified switches to forward the broadcast network packet from the ports that are coupled to the end hosts of the identified subset.

17. A method of using a controller to control switches in a network having end hosts that are coupled to the switches, wherein the controller is coupled to the switches by network control paths, the method comprising:
with the controller, receiving a broadcast network data packet from the switches; and
with the controller, forwarding the broadcast network data packet through the network control paths to at least one of the end hosts by generating a packet out message having a payload field that contains the broadcast network data packet and providing the packet out message to at least one of the switches that is interposed between the controller and the at least one of the end hosts.

18. The method defined in claim 17 wherein the controller maintains information identifying subsets of the end hosts that are associated with respective broadcast domains, the method further comprising:
with the controller, identifying which subset of the end hosts is associated with the broadcast network data packet, wherein forwarding the broadcast network data packet through network control paths to the at least one of the end hosts comprises forwarding the broadcast network data packet through network control paths to the end hosts of the identified subset.

19. The method defined in claim 17 further comprising:
with the controller, identifying which switches are coupled to the at least one of the end hosts, wherein forwarding the broadcast network data packet through network control paths to the at least one of the end hosts comprises forwarding the broadcast network data packet through network control paths to the identified switches.

20. The method defined in claim 19 wherein identifying which switches are coupled to the at least one of the end hosts comprises identifying which switches are coupled to the at least one of the end hosts based on network topology information gathered from the switches by the controller.

21. The method defined in claim 19 wherein forwarding the broadcast network data packet through the network control paths to the identified switches comprises:
sending OpenFlow control packets to the identified switches.

\* \* \* \* \*